UNITED STATES PATENT OFFICE.

GEORGE DUXON AND HENRY DUXON, OF BROOKLYN, NEW YORK, AND HENRY PERRY, OF NEWARK, NEW JERSEY.

IMPROVEMENT IN THE MANUFACTURE OF JAPANNED OR ENAMELED HORSE-COLLARS.

Specification forming part of Letters Patent No. 121,859, dated December 12, 1871.

*To all whom it may concern:*

Be it known that we, GEORGE DUXON and HENRY DUXON, of Brooklyn, in the county of Kings and State of New York, and HENRY PERRY, of Newark, in the county of Essex and State of New Jersey, have invented a new and useful Improvement in the Manufacture of Japanned or Enameled Horse-Collars; and we do hereby declare that the following is a full, clear, and exact description thereof.

Japanned or enameled horse-collars have heretofore been made of leather japanned or enameled before being made up into collars. When made in that way the enamel is liable to be cracked or otherwise injured by the stretching of the leather in the process of making up. Another serious defect in collars thus made consists in their perviousness to water through the seams. When collars made in the usual way are washed or are otherwise exposed to water the water will penetrate the seams, get into the straw stuffing, and soon destroy the collar.

We obviate these defects by first making the collar of plain leather and afterward applying several coats of enamel, as hereinafter described. By these means we obviate all liability to crack or injure the enamel by stretching the leather, and render the seams water-tight.

Our process is substantially as follows: We first make up the collar of plain or unenameled leather, and then apply from four to six coats of enamel prepared as follows: for the first and second coats we make a composition of the following-named ingredients, and in about the following proportions, to wit.: one pound of soap and three ounces of gutta-percha to eighty pounds of linseed-oil, and two ounces of umber to each gallon of oil; for the next two coats, four ounces of soap to eighty pounds of linseed-oil, and two ounces of umber to each gallon of oil; for finishing coats, six ounces of Prussian blue and half an ounce of umber to each gallon of oil. In each case the ingredients are to be boiled together until well cooked.

The said several coats are to be applied successively, and each coat rubbed down in the usual manner of preparing japanned or enameled leather. The enameling compound thus applied will so fill and close up the seams with a water-proof composition that no water can penetrate them in washing or by any ordinary exposure to water.

As many coats of enamel may be applied at each stage of the process as may be deemed expedient.

What we claim as our invention, and desire to secure by Letters Patent, is—

1. The process, substantially as herein described, of making japanned or enameled horse-collars.

2. As a new article of manufacture, a horse-collar made of unenameled leather and japanned or enameled after being made up, substantially as described.

GEORGE DUXON.
HENRY DUXON.
HENRY PERRY.

Witnesses:
STEPHEN V. MOERS,
HENRY LOUIS.

(72)